United States Patent
Gao et al.

(10) Patent No.: US 10,019,426 B2
(45) Date of Patent: Jul. 10, 2018

(54) GENERATING DATA FORMAT DESCRIPTION LANGUAGE SCHEMA

(71) Applicant: International Business Machines Corporation, Armonk, NY (US)

(72) Inventors: Tian Tian Gao, Beijing (CN); Fu Wei Huang, Beijing (CN); Xiao Dong Zhai, Beijing (CN); Pu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/724,851

(22) Filed: May 29, 2015

(65) Prior Publication Data

US 2015/0379049 A1     Dec. 31, 2015

(30) Foreign Application Priority Data

Jun. 30, 2014  (CN) .......................... 2014 1 0306019

(51) Int. Cl.
| | | |
|---|---|---|
| *G06F 17/30* | (2006.01) | |
| *G06F 17/24* | (2006.01) | |
| *G06F 17/22* | (2006.01) | |
| *G06F 17/27* | (2006.01) | |

(52) U.S. Cl.
CPC ........ *G06F 17/241* (2013.01); *G06F 17/2247* (2013.01); *G06F 17/272* (2013.01); *G06F 17/3092* (2013.01); *G06F 17/30908* (2013.01)

(58) Field of Classification Search
CPC ....................... G06F 17/30908; G06F 17/3092
USPC ........................................................ 707/804
See application file for complete search history.

(56) References Cited

U.S. PATENT DOCUMENTS

| | | | | |
|---|---|---|---|---|
| 2006/0248092 A1* | 11/2006 | Keller | ............... | G06F 17/30908 |
| 2009/0063718 A1* | 3/2009 | Sekine | .................. | G06F 9/4411 |
| | | | | 710/8 |
| 2009/0254572 A1* | 10/2009 | Redlich | .................. | G06Q 10/06 |
| 2010/0250497 A1* | 9/2010 | Redlich | ................... | F41H 13/00 |
| | | | | 707/661 |
| 2013/0187926 A1* | 7/2013 | Silverstein | ........... | G06Q 10/105 |
| | | | | 345/440 |
| 2014/0006980 A1* | 1/2014 | Belisario | ............. | G06F 3/04847 |
| | | | | 715/762 |

(Continued)

OTHER PUBLICATIONS

Anonymous, "Meta Model for Data Format Description Language (DFDL) annotations using XML schema," An IP.com Prior Art Database Technical Disclosure, Mar. 15, 2012, 6 pages, IP.com No. 000215991.

(Continued)

*Primary Examiner* — Mark E Hershley
(74) *Attorney, Agent, or Firm* — Robert J. Shatto

(57) ABSTRACT

An annotation retrieval module may be configured to retrieve annotations added to sample data, the annotations having been added according to an annotation rule. An analysis tool may be configured to create a logical schema and a configuration file from the retrieved annotations, according to the annotation rule. The logic schema may represent a tree structure containing one or more data elements corresponding to the sample data, and the configuration file may define one or more operations for adding DFDL annotations into the logic schema. A DFDL schema generator may be configured to generate a DFDL schema for the sample data according to the logic schema and the configuration file.

19 Claims, 7 Drawing Sheets

(56) References Cited

U.S. PATENT DOCUMENTS

2014/0007050 A1* 1/2014 Belisario ............. G06F 3/04847
717/113

OTHER PUBLICATIONS

Anonymous, "DFDL (Data Format Description Language) Type system for mapping COBOL structures to XML Schema along with physical representation," An IP.com Prior Art Database Technical Disclosure, May 17, 2012, 5 pages, IP.com No. 000218062.
Kimber, T., "Message Broker—Introduction to DFDL," IBM, 40 pages, © 2011 IBM Corporation.
CN Application 201410306019.9, entitled "Generating Data Format Description Language Schema," filed on Jun. 30, 2014, 27 pages.

* cited by examiner

```
                                                          631
                            632                          ↙
<xsd:element name="L1-Field1">
  <xsd:complexType>
    <xsd:sequence>                    632a                         632b
      <xsd:element name="L2-MethodName" type="xsd:string"/>
      <xsd:element maxOccurs="unbounded" minOccurs="0" name="L2-ParameterType" type="xsd:string"/>
    </xsd:sequence>
  </xsd:complexType>
</xsd:element>
```

FIG. 6A

```
                                                                              610
              610a
             ↙
        GenerationConfig.xml <tns:ModelTransformConfig source= "source/Hessian.xsd" target= "target/Hessian.xsd">
        <tns:TransformationConfig action-id= "AddAttribute"  ∼ 611
            input= "configv25/GenerationInput:/tns:InputConfig/tns:AddAttributeList[@ID='length']"/>
        <tns:TransformationConfig action-id= "AddAttribute"  ∼ 612
            input= "configv25/GenerationInput:/tns:InputConfig/tns:AddAttributeList[@ID='separator']"/>
      </tns:ModelTransformConfig>
     601            610b
    ↙              ↙
        GenerationInput.xml
                                    621
      <tns:AddAttributeList ID = "length">
        <tns:Attribute location= "/xsd:schema/xsd:element[@name='L1_Field1']"
            NS = "http://www.ogf.org/dfdl/dfdl-1.0/" name = "dfdl:length" value= "{/Message/L1-Length}">
        </tns:Attribute>
        <tns:Attribute location= "/xsd:schema/xsd:element[@name='L1_Field1']"
            NS = "http://www.ogf.org/dfdl/dfdl-1.0/" name = "dfdl:lengthKind" value="explicit">
        </tns:Attribute>                                                                           602
      </tns:AddAttributeList>
                                    622
      <tns:AddAttributeList ID = "separator">
        <tns:Attribute location="/xsd:schema/xsd:complexType/xsd:sequence"
            NS = "http://www.ogf.org/dfdl/dfdl-1.0/" name = "dfdl:separator" value="5f">
        </tns:Attribute>
      </tns:AddAttributeList>
```

FIG. 6B

```
           662                           664                            661
                                                                       ↙
<xsd:element dfdl:length = "{/Message/L1-Length}" dfdl:lengthKind ="explicit" name="L1-Field1">
  <xsd:complexType>            666
    <xsd:sequence dfdl:separator ="%#r5f;">
      <xsd:element name="L2-MethodName" type="xsd:string"/>
      <xsd:element maxOccurs="1" minOccurs="1" name="L2-ParameterType" nillable="false" type="xsd:string"/>
    </xsd:sequence>
  </xsd:complexType>
</xsd:element>
```

FIG. 6C

GENERATING DATA FORMAT DESCRIPTION LANGUAGE SCHEMA

BACKGROUND

The present invention relates to a Data Format Description Language (DFDL) and particularly to a generating tool of a DFDL schema.

The Data Format Description Language (DFDL) is a specification for the description of a text data format and a binary data format.

A technical implementation has emerged so far to make use of a DFDL schema for converting unstructured data into structured data conforming to the DFDL specification, or for converting structured data conforming to the DFDL specification into unstructured data. Generation of the DFDL schema has become increasingly important along with a growing number of applications of the DFDL. The DFDL schema consists of a logic schema and DFDL annotations. There is a tool for generating the DFDL schema manually in the prior art, but this tool may be rather demanding for a user. For example, the user may be required to create the logic schema manually according to sample data and to add the corresponding DFDL annotations to the logic schema. Accordingly, the user may be required to be familiar with both the semantics of the sample data and the DFDL specification. This may present a significant challenge to the user.

SUMMARY

Embodiments of the present disclosure provide a method, apparatus, and computer program product for generating a Data Format Description Language (DFDL) schema. An annotation retrieval module may be configured to retrieve annotations added to sample data, the annotations having been added according to an annotation rule. An analysis tool may be configured to create a logic schema and a configuration file from the retrieved annotations, according to the annotation rule. The logic schema may represent a tree structure containing one or more data elements corresponding to the sample data, and the configuration file may define one or more operations for adding DFDL annotations into the logic schema. A DFDL schema generator may be configured to generate a DFDL schema for the sample data according to the logic schema and the configuration file.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6A and FIG. 6B illustrate a logic schema and a configuration file created according to an embodiment of the invention.

FIG. 6C illustrates a DFDL schema generated according to the logic schema and the configuration file illustrated in FIG. 6A and FIG. 6B, according to an embodiment of the invention.

DETAILED DESCRIPTION

An object of the invention is to provide a method and apparatus for simplifying generation of a DFDL schema.

In one aspect, there is provided a method for generating a Data Format Description Language (DFDL) schema, comprising:

retrieving annotations added to sample data according to an annotation rule;

creating a logic schema and a configuration file according to the annotation rule and the retrieved annotations added to the sample data, wherein the logic schema represents a tree structure of data elements in the sample data, and the configuration file defines computer executable operations of adding DFDL annotations corresponding to the annotations into the logic schema; and generating a DFDL schema corresponding to the sample data according to the logic schema and the configuration file.

In another aspect, there is provided an apparatus for generating a Data Format Description Language (DFDL) schema, comprising:

an annotation retrieval module configured to retrieve annotations added to sample data according to an annotation rule;

an analysis tool configured to create a logic schema and a configuration file according to the annotation rule and the retrieved annotations added to the sample data, wherein the logic schema represents a tree structure of data elements in the sample data, and the configuration file defines computer executable operations of adding DFDL annotations corresponding to the annotations into the logic schema; and a DFDL schema generator configured to generate a DFDL schema corresponding to the sample data according to the logic schema and the configuration file.

With the invention, a user merely needs to be familiar with the structure and the semantics of the sample data, and the DFDL schema corresponding to the sample data can be generated automatically even if he or she is unfamiliar with the DFDL specification.

Some preferable embodiments of the disclosure will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
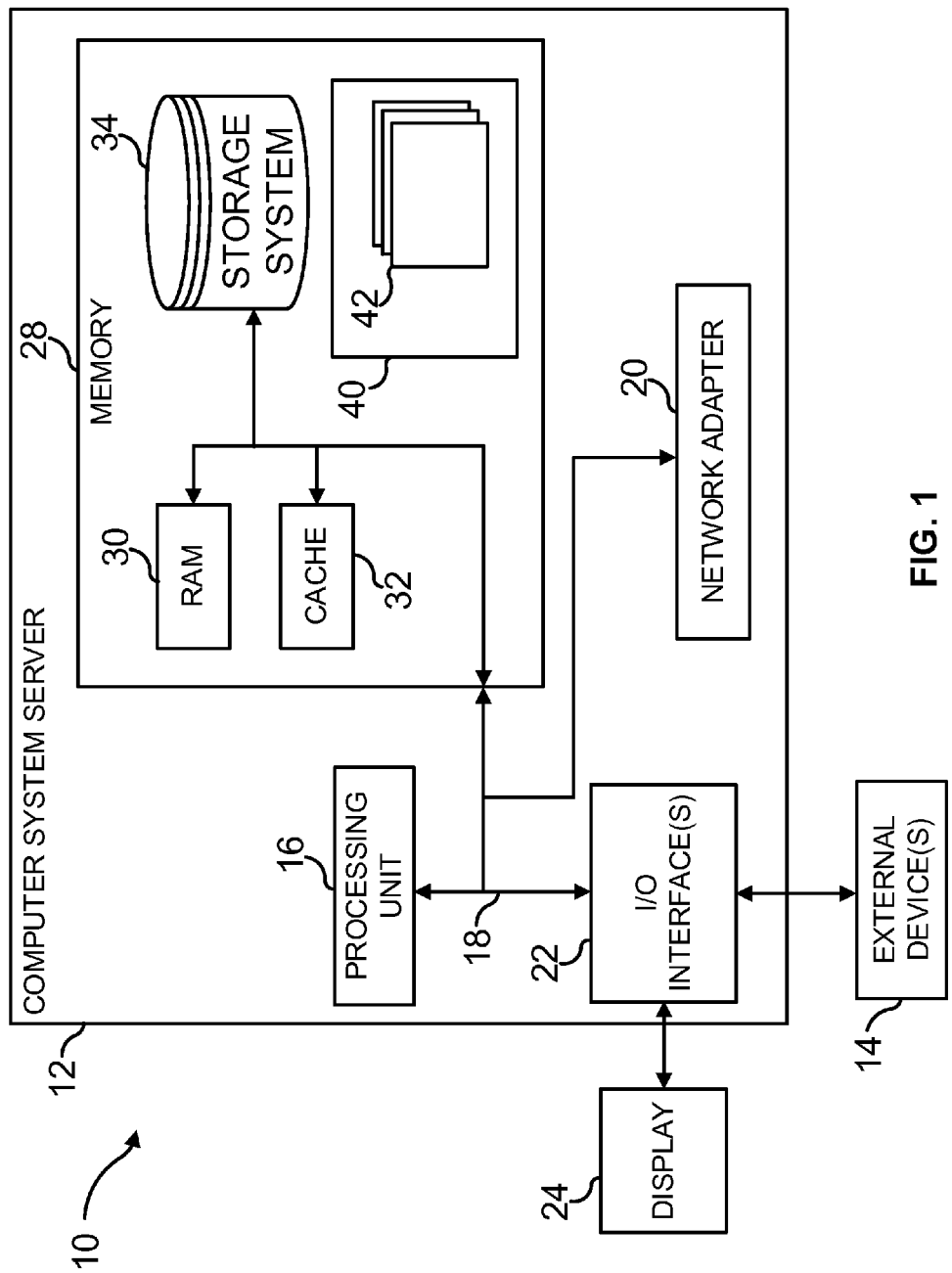
FIG. 1 illustrates a block diagram of an exemplary computer system/server suitable to implement the embodiments of the present invention.

Referring now to FIG. 1, in which an exemplary computer system/server 12 which is applicable to implement the embodiments of the present invention is illustrated. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated and typically called a "hard drive"). Although not illustrated, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/tool 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The computer system/server 12 shown in FIG. 1 is suitable to implement various embodiments of the invention.

Figure 2:
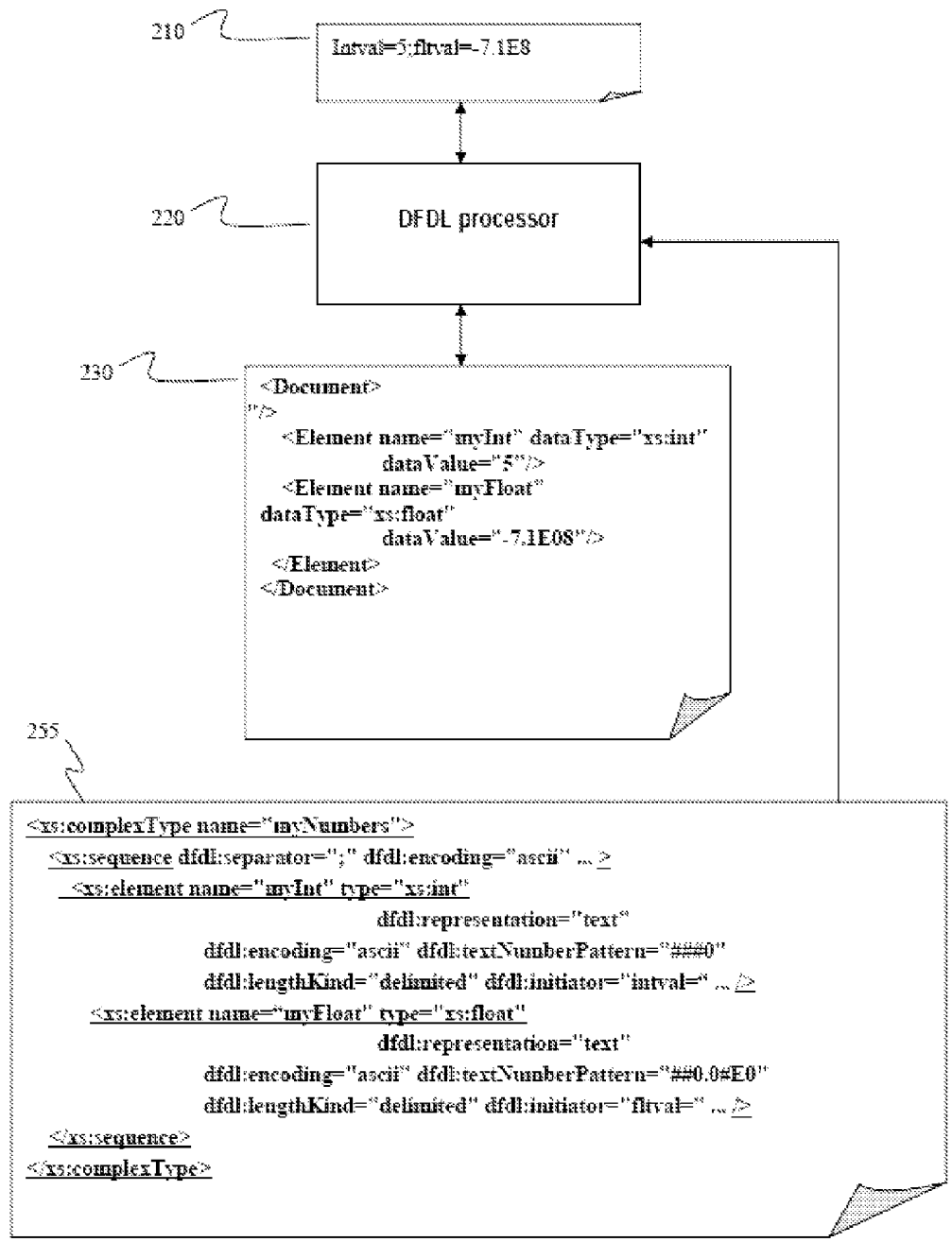
FIG. 2 illustrates a relationship among a DFDL schema, a DFDL document, and unstructured data.

Now referring to FIG. 2, FIG. 2 illustrates a relationship among a DFDL schema, a DFDL document, and unstructured data. Specifically, FIG. 2 illustrates an unstructured data stream "Intval=5;fltval=−7.1E8" 210, a DFDL processor 220, a DFDL document 230, and a pre-generated DFDL schema 255.

As known to those skilled in the art, the DFDL schema 255 consists of a logic schema and DFDL annotations. The logic schema, also referred to as a "DFDL logic" or a "logic instance," describes the structure of the unstructured data stream in an XML document of a tree structure. The DFDL annotations are used to describe information defined in a data format other than the logic schema in the unstructured data stream. As shown, underlined sections in the DFDL schema 255 represent the logic schema, and non-underlined sections represent the DFDL annotations.

As described in the Background section of the invention, unstructured data can be converted into structured data or structured data can be converted into unstructured data using a DFDL schema. As shown, the DFDL processor 220 can convert the data stream 210 into the DFDL document 230 and vice versa according to the DFDL schema 255.

In order to simplify the generation of the DFDL schema, semantics of sample data are first marked according to a predetermined annotation rule, and then the sample data are analyzed automatically according to the annotation rule and annotations on the sample data, and a computer readable description of the sample data is created according to the DFDL specification, so that the DFDL schema can be generated automatically.

Figure 3:
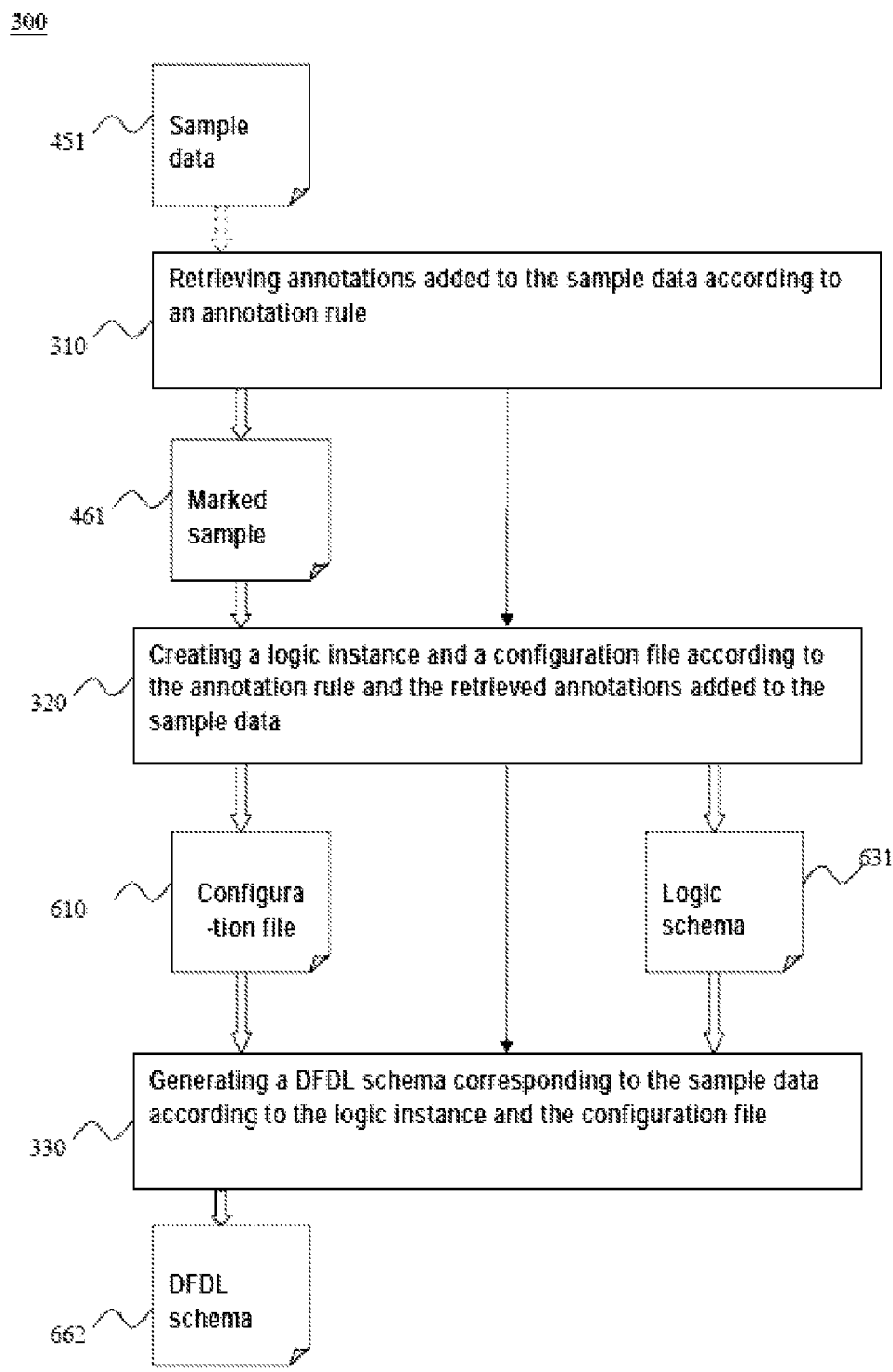
FIG. 3 schematically illustrates a flow chart of a method for generating a DFDL schema according to an embodiment of the invention.

Referring to FIG. 3, there is schematically illustrated a flow chart of a method 300 for generating a DFDL schema, according to an embodiment of the invention. As shown, the method includes steps 310, 320 and 330. The respective steps will be described below in details with reference to the other drawings.

As shown, the method 300 can start with the reception of sample data 451 provided by a user.

Figure 4A:
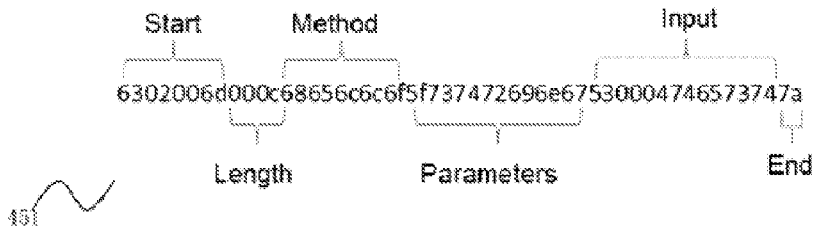
FIG. 4A illustrates an example of sample data.

FIG. 4A illustrates an example of sample data 451. The sample data 451 is a hexadecimal data stream representing a message of method invocation. The sample data 451 is structured as "Start"-"Message"-"End," wherein "Message" is structured as "Method"-"Parameter"-"Input." "Length" defines the length of the message.

More specifically, respective fields included in the sample data 451 are defined as in Table 1 below:

TABLE 1

| Field No. | Contents (hexadecimal) | Semantics | Meaning |
|---|---|---|---|
| 1 | 6320006d | Start Delimiter | |
| 2 | 000c | Length Delimiter | 12 (in characters) |
| 3 | 68656c6c6f | Method Name | hello |
| 4 | 5f | Separator | |
| 5 | 737472696e67 | Parameter | string |
| 6 | 53 | Separator | S |
| 7 | 0004 | Length Delimiter | 4 (in characters) |
| 8 | 74657374 | Input | test |
| 9 | 7a | End Delimiter | |

All of the fields "68656c6c6f", "737472696e67" and "74657374" in Table 1 are data elements or elements in the sample data 451.

First, in step 310, annotations added to the sample data 451 according to an annotation rule are retrieved.

In the context of the invention, the sample data 451 refers to a sample of a category of data from which a corresponding DFDL schema is generated for the category of data. According to an embodiment of the invention, an annotation tool for marking semantics of the sample data 451 according to an annotation rule is provided to generate annotations of respective fields of the sample data. The annotation tool for marking semantics of sample data 451 according to an annotation rule is also referred to as a human-machine interface (or a user interface that is not illustrated) in which an annotation rule is defined and editing means are provided. A user can mark the semantics of the sample data 451 (i.e., adding the annotations to the respective fields of the sample data) using the provided editing means according to the annotation rule, thereby generating the marked sample data 461.

According to an embodiment of the invention, in step 310, the annotations added to the sample data 451 according to the annotation rule can be retrieved from the annotation tool for marking semantics of sample data according to an annotation rule.

According to an embodiment of the invention, the annotation tool can be implemented by a graphic editor. The graphic editor provides an annotation rule and provides editing means for marking the semantics of sample data according to the annotation rule. The user can add the annotations to the respective fields of the sample data 451 using the editing means provided by the graphic editor. The annotation rule provided by the graphic editor is also referred to as a default annotation rule.

Figure 4B:
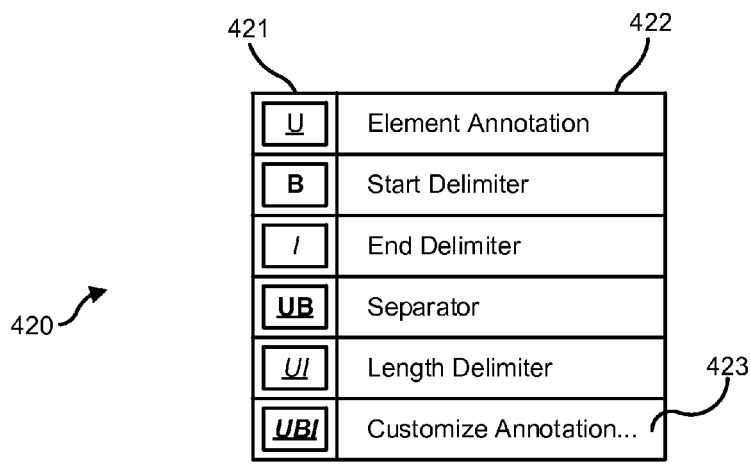
FIG. 4B illustrates a part of a human-machine interface for marking semantics of sample data.

Referring to FIG. 4B, there is illustrated a part of a human-machine interface for marking semantics of sample data. Specifically, the graphic editor presents a user with an annotation rule for marking semantics of sample data via an option menu 420.

In the option menu 420 there is listed a correspondence relationship between a typographical emphasis 421 (e.g., bolding text) and an annotation 422. In this example, an underlined text corresponds to "Element Annotation" (which represents an element annotation).

For example, if the semantics of the third field "68656c6c6f" of the sample data 451 are to be marked as "Element", then the user can first select "68656c6c6f" using a mouse and then click on the "underline text" icon displayed on the option menu 420 so that the text of "68656c6c6f" is underlined.

Different typographic emphasis icons 421 in the option menu 420 have different emphases, which can intuitively show a correspondence relationship between an emphasis and an annotation. For example:
bolded text corresponds to "Start Delimiter";
italicized text corresponds to "End Delimiter";
underlined and bolded text corresponds to "Separator";
underlined and italicized text corresponds to "Length Delimiter."

According to an embodiment of the invention, the graphic editor provides a tool for the user to define an additional annotation rule.

For example, a "Customize Annotation" option 423 can be provided in the option menu 420 to allow the user to operate the graphic editor to define an extra annotation rule.

For example, the user can additionally define via the "Customize Annotation" option 423 an annotation rule for representing in underlined, bolded, and italicized text a user-customized fixed-length element. The extra defined annotation rule will be included in the annotation rule of the graphic editor.

Figure 4C:
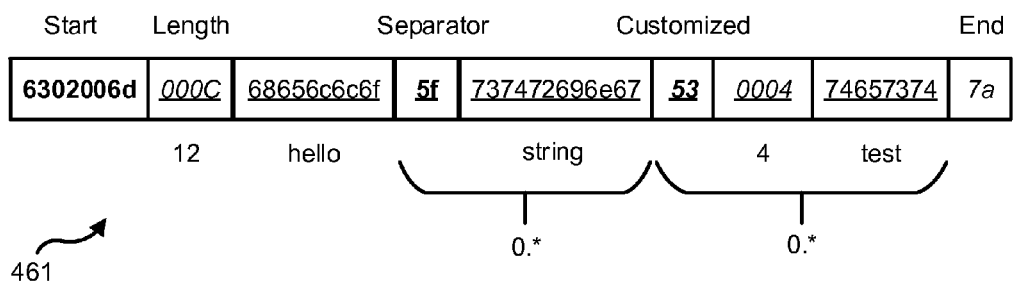
FIG. 4C illustrates sample data, for which semantics are marked, generated according to an embodiment of the invention.

Semantics of the other fields are marked in the same way as the third field "68656c6c6f" is marked, thereby generating the sample data 461 for which the semantics are marked as shown in FIG. 4C.

In the sample data 461 for which the semantics are marked, the bolded text of the first field "6302006d" represents "Start" (a start delimiter); the underlined and italicized text of the second field "000c" represents "Length" with a decimal value of 12; the underlined text of the third field "6865656c6c6f" represents an element, i.e., a string of characters "hello"; the underlined and bolded text of the fourth field "5f" represents "Separator" to separate different definitions of parameter types; the underlined text of the fifth field "737472696e67" represents an element, i.e., a string of characters "string"; the underlined, bolded, and italicized text of the sixth field "53" represents a user-customized annotation representative of a fixed-length element, the character "S" here (the abbreviation of "String"); the underlined and italicized text of the seventh field "0004" represents "Length" with a decimal value of 4; the underlined text of the eighth field "74657374" represents an element, i.e., the value "test" of a first input parameter with the length of 4; and the italicized text of the ninth field "7a" represents "End" (an end limiter).

It shall be noted that in the example above, the semantics of the different fields in the sample data are distinguished by the annotation rule by marking them with different typographical emphases, but this marking approach is merely exemplary. In other embodiments, the sample data can be annotated by any other computer readable mark; for example, the semantics of the different fields in the sample data can be distinguished by colors as marks; for example, a start delimiter can be represented in green, an element annotation can be represented in blue, etc.

Thus, according to an embodiment of the invention, the semantics of the different fields in the sample data can be distinguished in the form of either a color or a font or both.

It shall be noted that in the sample data 461 for which the semantics are marked illustrated in FIG. 4C, the annotation "0.*" represents repeatability, that is, the input parameter "5f37472696e67" starting with the separator "5f" is a repeatable element; and also the abbreviation of the type of the input parameter, the length, and the particular value "53000474657374" are repeatable elements. Such a repeatable element can be marked in various forms, a repeated description of which will be omitted here.

After the human-machine interface for marking semantics of the sample data 451 according to an annotation rule is provided in step 310, the process of method 300 proceeds to step 320 if the user creates the annotations of the respective fields of the sample data via the human-machine interface.

In step 320, a logic schema 631 and a configuration file 610 are created according to the annotation rule and the retrieved annotations added to the sample data, wherein the logic schema represents a tree structure of data elements in the sample data, the configuration file defines computer executable operations of adding DFDL annotations corresponding to the annotation rule into the logic schema.

First, the marked sample data 461 carrying the annotations added thereto can be retrieved from the human-machine interface.

According to an embodiment of the invention, creating the logic schema 631 and the configuration file 610 according to the annotation rule and the retrieved annotations added to the sample data 451 comprises deriving the corresponding tree structure according to the annotation rule and the retrieved annotations added to the sample data, nodes of the tree structure include the elements and the annotation in the sample data.

Figure 5A:
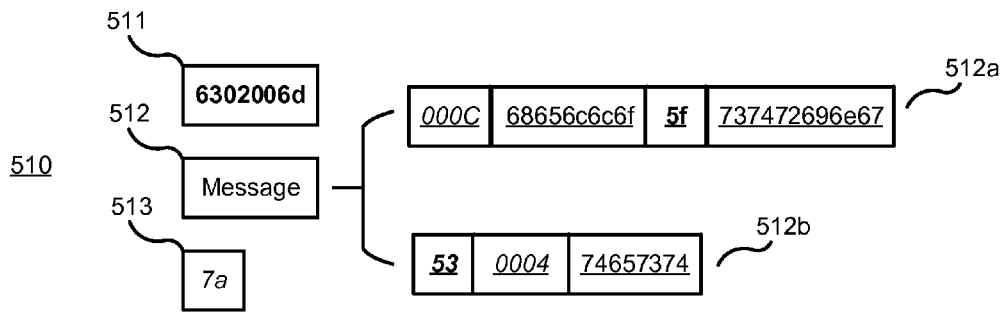
FIGS. 5A-C schematically illustrate a process of analyzing a tree structure of sample data, for which semantics are marked, according to an embodiment of the invention.
Figure 5B:
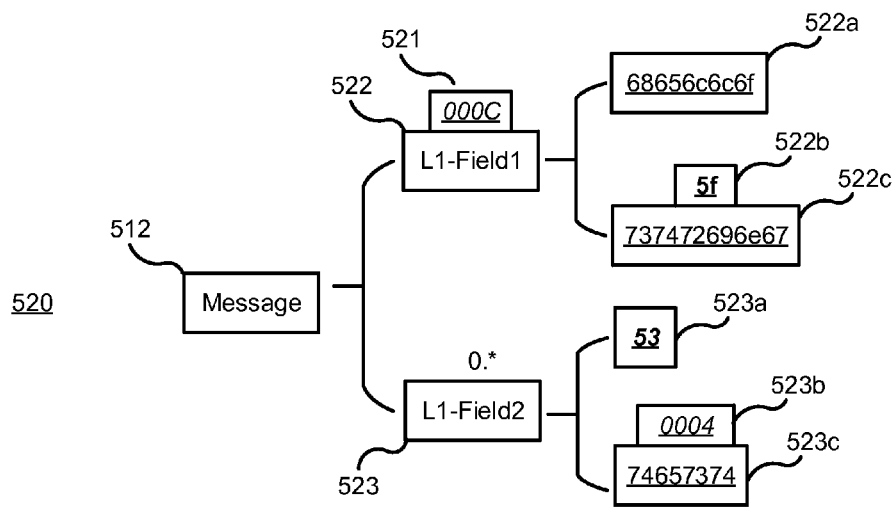
Figure 5C:
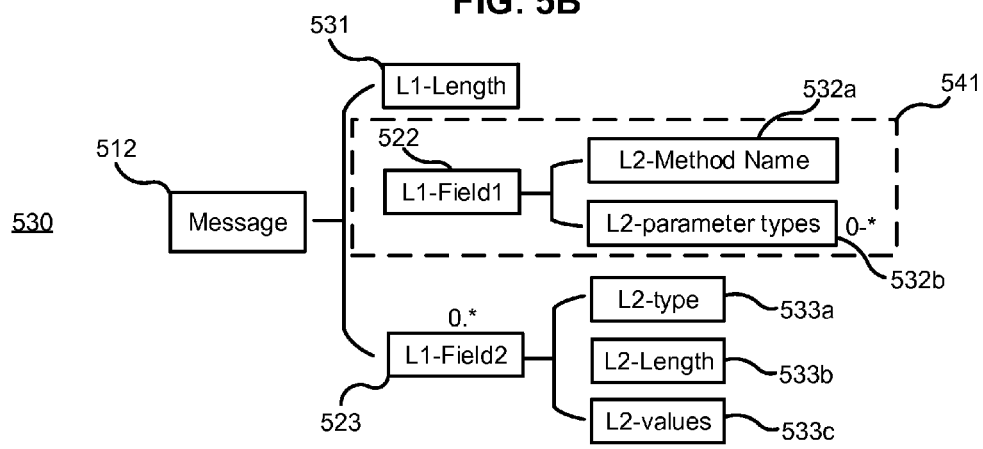

FIGS. 5A-C schematically illustrate a process of analyzing a tree structure of sample data for which semantics are marked according to an embodiment of the invention.

First, a tree structure 510 corresponding to the marked sample data 461 can be derived according to the annotation rule and the relevant annotations in the marked sample data 461. The tree structure 510 includes nodes 511, 512, and 513. The nodes 511 and 513 represent a start delimiter ("6302006d") and an end delimiter ("7a"), respectively. The node 512 represents a message between the start delimiter and the end delimiter, wherein, according to the length delimiter "000c" (in 16 characters), a child node 512a of the node 512 represents "000c" and a string of characters succeeding thereto with the length of 12, and the other child node 512b represents a succeeding string of characters, i.e., a string of characters from a separator "53" to the end delimiter (exclusive).

The nodes 512a and 512b can be further decomposed into a tree structure 520 representing the node 512. In the tree structure 520, the node 512 has three child nodes 521, 522, and 523.

The node 521 represents a length delimiter in the node 512a.

The child node 522 is named "L1_Field1" automatically with a child node 522b thereof representing the separator "5f" and other two child nodes 522a and 522c representing two sections preceding and succeeding to the separator "5f" respectively, wherein the child node 522a represents the definition of a method name, and the child node 522b represents the definition of a parameter.

The node 523 is named "L1_Field2" automatically with a child node 523a thereof representing a user-customized fixed-length element representative of the abbreviation of the type of an input parameter, a child node 523c representing the real value of the input parameter and a child node 523b representing the length of 523c.

The nodes 523a, 523b and 523c together represent the real type and the particular value of an input parameter, and if there are a plurality of input parameters, these three child nodes will be a repeatable element so that the annotation "0.*" representing repeatability is added to L1_Field2.

A tree structure 530 that cannot be further decomposed can be further derived from the tree structure 520, wherein the node 521 is named "L1-Length" 531 automatically, and the node 522a is named "L2_Method Name" 532a automatically; the nodes 522b and 522c are merged into a node 532b named "L2-parameter types" 532b which is a repeatable element so that the annotation "0.*" representing repeatability is added; and the node 523a is named "L2-type" 533a, and the child node 523c is named "L2-values" 533c.

In the tree structure 530, the crucial length separators are extracted as separate elements to parse and record the values of the lengths and to further parse a subsequent node, wherein the node 521 represents the definition of a length with the value of "000c" equivalent to decimal "12" representative of the length of a subsequent element in 12 characters. Likewise, the node 523b also represents the definition of a length with the value of "0004" equivalent to decimal "4," representative of the length of a subsequent element in 4 characters, and here is named "L2-Length" 533b automatically. It shall be noted that the node elements in the tree structure, e.g., "L2_Method Name" 532a, etc., are named automatically with a naming rule in order to further clarify the illustration.

The process of analyzing a tree structure of sample data for which semantics are marked has been described above. It shall be noted that the representation in the analysis process above is merely exemplary, and those skilled in the art can appreciate that the representation can be in an alternative computer readable form.

The respective computer readable logic schema 631 and configuration file 610 can be created according to the analyzed tree structure.

According to an embodiment of the invention, an XML schema corresponding to the tree structure can be created as the logic schema 631.

For conciseness of the description, a child tree 541 in the tree structure 530 will be described below only by way of an example with respect the creation of a logic schema and a configuration file.

As shown, the child tree 541 includes a parent node 522 and two child nodes thereof 532a and 532b, and this structure can be recorded in a document in the XML format as a logic schema corresponding to the child tree 541.

Referring to FIG. 6A, there is schematically illustrated a corresponding logic schema 631 of the child tree 541 created according to the embodiment of the invention, wherein three elements 632, 632a, and 632b in the logic schema 631 correspond to the parent node 522 and the two child nodes thereof 532a and 532b of the child tree 541, respectively.

According to an embodiment of the invention, the created configuration file includes the following definitions:

operations relating to the elements and the attributes of the sample data; and the locations of the elements and the attributes of the sample data in the XML schema to which the operations relate.

Referring to FIG. 6B, there is schematically illustrated a corresponding configuration file of the child tree 531 created according to the embodiment of the invention. The configuration file 610 illustrated in FIG. 6B includes two sections.

The first section is for declaring operations and generation processes and is expressed in an xml document 610a named "GenerationConfig.xml." "AddAttribute" declarations 611 and 612 in the xml document 610a represent an operation of "AddAttribute."

The second section is for inputting parameters of the operations declared by the first section and is expressed in an xml document 610b named "GenerationInput.xml." In a statement 621 in the xml document 610b, "/xsd:schema/xsd:element[@name='L1_Field1']" (which means "an element named L1_Field1") describes the location of the element L1_Field1 (522 shown in FIG. 5B) in the logic schema 631, "dfdl:length" describes the name "length" of an attribute to be added, and "{/Message/L1-Length}" describes the specific value of the attribute to be added, the attribute corresponds to the node 531 representing the length delimiter in the tree structure 530.

Likewise, a statement 622 describes the name "separator" and the specific value of an attribute need to be added, the attribute corresponds to the node 532b representing the separator ("5f") in the node 532b of the tree structure 530.

As indicated by an arrow 601, the first declaration 611 of the operation of "AddAttribute" specifies the location of the statement 621 of the attribute to be added in the document "GenerationInput.xml" 610b.

As indicated by an arrow 602, the second declaration 612 of the operation of "AddAttribute" specifies the location of the statement 622 of the attribute to be added in the document "GenerationInput.xml" 610b.

Referring again to FIG. 3, step 330 is performed after step 320.

In step 330, a DFDL schema corresponding to the sample data is generated according to the logic schema 631 and the configuration file 610.

According to an embodiment of the invention, generating the DFDL schema corresponding to the sample data according to the logic schema and the configuration file comprises performing an operation of adding the DFDL annotations corresponding to the semantics of the elements in the XML schema to the elements.

In a specific implementation, a generating program having the configuration file and the logic schema as inputs can be executed. The generating program operates by scanning the operations defined in GenerationConfig.xml 610a (e.g., the operation of "AddAttribute" defined by "action-id=AddAttribute"), and the corresponding locations in the logic schema 631, and the names and the values of the attributes or the elements to be added are retrieved from GenerationInput.xml 610b, and then DFDL annotations corresponding to the annotations added in step 310 are added in an appropriate place in the logic schema 631. Respective XML parsed, modified, and saved APIs are invoked to generate the DFDL schema corresponding to the sample data. Invocation processes of the APIs are packaged in the operation of "AddAttribute" of GenerationConfig.xml 610a. Since GenerationConfig.xml 610a describes the locations of the elements (e.g., L1_Field1) in the sample data in the logic schema 631, and the names and the values of the attributes to be added, the corresponding APIs can be executed by the generating program to add the DFDL annotations corresponding to the annotations added in step 310 in an appropriate place in the logic schema 631, the result of which is illustrated in FIG. 6C. FIG. 6C illustrates the DFDL schema 661 generated by step 330. As compared with the logic schema 631 illustrated in FIG. 6A, DFDL annotations 662, 664 and 666 are added to the DFDL schema 661.

For example, the generating program first loads and parses GenerationConfig.xml 610a and retrieves an operation to be performed, e.g., "AddAttribute," and then loads and parses GenerationInput.xml 610b according to the value of the input attribute "configv25/GenerationInput:/tns:InputConfighns:AddAttributeList[@ID='length']" to retrieve a detailed input definition of the operation of "AddAttribute," including the location of an attribute to be added "/xsd:schema/xsd:element[@name='L1_Field1']," the name of the attribute "Length," and the value of the attribute "{/Message/L1-Length}." Then, the generating program loads and parses the logic schema 631, positions an element named "L1_Field1" according to the definitions of the location, and adds the attribute of "Length" and the value thereof to the element.

In a specific implementation, the generating program can be a part of a DFDL engine or can be a standalone operating program. Performing an operation of loading and parsing a file, searching for an element, modifying an attribute, etc., by the generating program can be achieved with existing APIs. Details of the generating program that can be designed by those skilled in the art according to the logic schema and the configuration file created according to the embodiment of the invention will be omitted here.

The process of generating a DFDL schema for the child tree 541 in the tree structure 530 has been described above. Those skilled in the art shall appreciate that a DFDL schema corresponding to the entire tree structure 530 can be generated if the process above is performed for the tree structure 530.

The respective embodiments of the method according to the invention have been described above with reference to the drawings. Those skilled in the art can appreciate that the method can be embodied in software or can be embodied in hardware or can be embodied in combination of software and hardware. Moreover, those skilled in the art can appreciate that an apparatus for generating a DFDL schema in light of the same inventive idea can be provided by performing the respective steps in the method above in software, hardware or both. Stated otherwise, the apparatus is substantially the same in hardware as a general-purpose processing device, but software embodied therewith functions to enable the apparatus to be characterized differently from the general-purpose processing device thus resulting in the apparatus according to respective embodiments of the invention.

Figure 7:
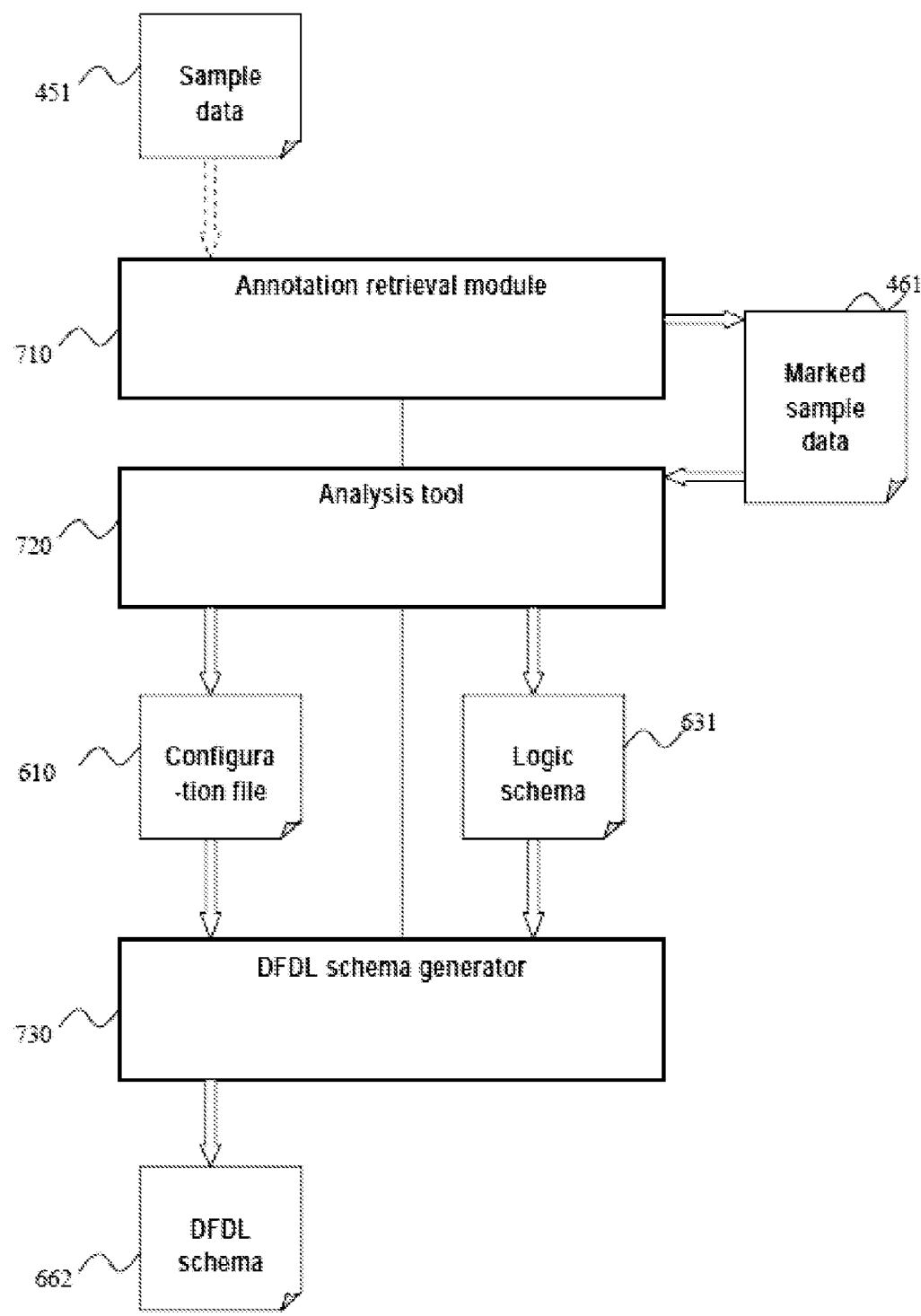
FIG. 7 schematically illustrates a simplified block diagram of an apparatus for generating a DFDL schema according to an embodiment of the invention.

Based upon the same inventive idea, the invention further proposes an apparatus for generating a DFDL schema. FIG. 7 schematically illustrates a simplified diagram of an apparatus for generating a DFDL schema according to an embodiment of the invention.

An apparatus for generating a DFDL schema according to an embodiment of the invention as illustrated in FIG. 7 includes:

an annotation retrieval module 710 configured to retrieve annotations added to sample data 451 according to an annotation rule from the marked sample data 461;

an analysis tool 720 configured to create a logic schema 631 and a configuration file 610 according to the annotation rule and the annotations retrieved from the marked sample data 461, wherein the logic schema represents a tree structure of data elements in the sample data, and the configuration file defines operations of adding DFDL annotations into the logic schema; and a DFDL schema generator 730 configured to generate a DFDL schema 662 corresponding to the sample data according to the logic schema and the configuration file.

According to an embodiment of the invention, the annotation retrieval module 710 is further configured to retrieve the annotations added to the sample data 451 according to the annotation rule from an annotation tool for marking semantics of sample data according to an annotation rule.

According to an embodiment of the invention, the annotation tool is a graphic editor providing the annotation rule and providing editing means for marking the semantics of the sample data according to the annotation rule.

According to an embodiment of the invention, the annotation tool provides a tool for a user to define an additional annotation rule.

According to an embodiment of the invention, the analysis tool is configured to derive a corresponding tree structure according to the annotation rule and the retrieved annotations added to the sample data, nodes of the tree structure include the elements and the annotations in the sample data.

According to an embodiment of the invention, the analysis tool is further configured to create an XML schema corresponding to the tree structure as the logic schema.

According to an embodiment of the invention, the configuration file includes the following definitions:

operations relating to the elements and the attributes of the sample data; and the locations of the elements and the attributes of the sample data in the XML schema to which the operations relate.

According to an embodiment of the invention, the DFDL schema generating program is further configured to perform an operation of adding the DFDL annotations corresponding to the semantics of the elements in the XML schema to the elements.

The embodiment of the apparatus for generating a DFDL schema of the invention has been described above. The content of the apparatus duplicated to or derived from the description of the method generating a DFDL schema have been omitted in the description of the embodiment of the apparatus for generating a DFDL schema.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for generating a Data Format Description Language (DFDL) schema, the method comprising:
    retrieving annotations added to sample data according to an annotation rule;
    analyzing, automatically by a processor, the annotated sample data;
    generating, by the processor, a computer readable description of the annotated sample data according to the DFDL specification;
    creating, using the computer readable description of the annotated sample data, a logic schema and a configuration file according to the annotation rule and the retrieved annotations added to the sample data, wherein the logic schema represents a tree structure of data elements in the sample data, and the configuration file defines computer executable operations for adding DFDL annotations corresponding to the annotations into the logic schema, wherein the configuration file includes a first section and a second section, the first section including code for declaring operations and generation processes, the second section including code for inputting parameters of the operations declared in the first section;
    generating, automatically by the processor, a DFDL schema corresponding to the sample data according to the logic schema and the configuration file by:
        loading and parsing the first section of the configuration file;
        retrieving, based on the parsing of the first section of the configuration file, an operation to be performed from the first section of the configuration file;
        loading and parsing the second section of the configuration file according to a value of an input attribute in the operation;
        retrieving, based on the parsing the second section of the configuration file, an input definition of the operation, wherein the input definition of the operation includes a location of an attribute to be added to the DFDL schema, a name of the attribute, and a value of the attribute;
        loading and parsing the logic schema using the location to determine a definition for an element; and
        generating the element in the DFDL schema using the definition, wherein the element includes the name of the attribute and the value of the attribute;
    receiving, by the processor, a stream of data; and
    converting, automatically by the processor, the stream of data into a DFDL document using the generated DFDL schema.

2. The method according to claim 1, wherein the annotations added to the sample data according to the annotation rule is retrieved from an annotation tool for marking semantics of the sample data according to the annotation rule.

3. The method according to claim 2, wherein the annotation tool is implemented by a graphic editor providing the annotation rule and providing means for marking the semantics of the sample data according to the annotation rule.

4. The method according to claim 3, wherein the annotation tool provides a tool for a user to define an extra annotation rule.

5. The method according to claim 1, wherein the creating the logic schema and the configuration file according to the annotation rule and the retrieved annotations added to the sample data comprises:
    deriving a corresponding tree structure according to the annotation rule and the retrieved annotations added to the sample data, nodes of the tree structure comprising the data elements and the annotations in the sample data.

6. The method according to claim 5, wherein the creating the logic schema and the configuration file according to the annotation rule and the retrieved annotations added to the sample data further comprises:
    creating an XML schema corresponding to the tree structure as the logic schema.

7. The method according to claim 6, wherein the configuration file further comprises:
    operations relating to the data elements in the sample data and attributes of the sample data; and
    locations of the data elements and the attributes in the XML schema.

8. The method according to claim 7, wherein the generating the DFDL schema corresponding to the sample data according to the logic schema and the configuration file further comprises:
    performing an operation of adding the DFDL annotations corresponding to semantics of the data elements in the XML schema to the data elements.

9. The method of claim 5, wherein deriving a corresponding tree structure according to the annotation rule and the retrieved annotations added to the sample data in automatically performed by the processor.

10. The method of claim 9, wherein deriving a corresponding tree structure according to the annotation rule and the retrieved annotations added to the sample data includes:
    identifying a start delimiter, an end delimiter, and a message; and decomposing the message into plurality of nodes by identifying one or more separators, one or more length delimiters, and one or more user-customized fixed-length elements.

11. An apparatus for generating a Data Format Description Language (DFDL) schema, the apparatus comprising:
a memory; and
a processor communicatively coupled to the memory, wherein the processor is configured to perform a method comprising:
retrieving annotations added to sample data according to an annotation rule;
analyzing, automatically, the annotated sample data;
generating a computer readable description of the annotated sample data according to the DFDL specification;
creating, using the computer readable description of the sample data, a logic schema and a configuration file according to the annotation rule and the retrieved annotations added to the sample data, wherein the logic schema represents a tree structure of data elements in the sample data, and the configuration file defines computer executable operations of adding DFDL annotations, corresponding to the retrieved annotations, into the logic schema, wherein the configuration file includes a first section and a second section, the first section including code for declaring operations and generation processes, the second section including code for inputting parameters of the operations declared in the first section;
generating, automatically, a DFDL schema corresponding to the sample data according to the logic schema and the configuration file by:
loading and parsing the first section of the configuration file;
retrieving, based on the parsing of the first section of the configuration file, an operation to be performed from the first section of the configuration file;
loading and parsing the second section of the configuration file according to a value of an input attribute in the operation;
retrieving, based on the parsing the second section of the configuration file, an input definition of the operation, wherein the input definition of the operation includes a location of an attribute to be added to the DFDL schema, a name of the attribute, and a value of the attribute;
loading and parsing the logic schema using the location to determine a definition for an element; and
generating the element in the DFDL schema using the definition, wherein the element includes the name of the attribute and the value of the attribute;
receiving a stream of data; and
converting, automatically, the stream of data into a DFDL document using the generated DFDL schema.

12. The apparatus according to claim 11, the apparatus further comprising:
an annotation tool for marking semantics of the sample data according to the annotation rule, wherein the annotations added to the sample data according to the annotation rule are retrieved from the annotation tool.

13. The apparatus according to claim 12, wherein the annotation tool is a graphic editor providing the annotation rule and providing means for marking the semantics of the sample data according to the annotation rule.

14. The apparatus according to claim 13, wherein the annotation tool provides a tool for a user to define an extra annotation rule.

15. The apparatus according to claim 11, wherein creating the logic schema and the configuration file include:
deriving a corresponding tree structure according to the annotation rule and the retrieved annotations added to the sample data, nodes of the tree structure comprising the data elements and the annotations in the sample data.

16. The apparatus according to claim 15, wherein the method performed by the processor further comprises creating an XML schema corresponding to the tree structure as the logic schema.

17. The apparatus according to claim 16, wherein the configuration file further comprises:
operations relating to the data elements in the sample data and attributes of the sample data; and
locations of the data elements and the attributes in the XML schema.

18. The apparatus according to claim 17, wherein the method performed by the processor further comprises adding the DFDL annotations corresponding to semantics of the elements in the XML schema to the elements.

19. A computer program product for generating a Data Format Description Language (DFDL) schema, the computer program product comprising a computer readable storage medium having program instructions embodied therewith, the program instructions executable by a processor to cause the processor to:
retrieve annotations from a sample data, the annotation corresponding to an annotation rule;
analyze, automatically, the annotated sample data;
generate a computer readable description of the annotated sample data according to the DFDL specification;
create, using the computer readable description of the annotated sample data, a logic schema and a configuration file according to the annotation rule and using the retrieved annotation, wherein the logic schema represents a tree structure of data elements, and the configuration file defines one or more operations for adding DFDL annotations into the logic schema, the DFDL annotations corresponding to the retrieved annotations, wherein the configuration file includes a first section and a second section, the first section including code for declaring operations and generation processes, the second section including code for inputting parameters of the operations declared in the first section;
generate, automatically, a DFDL schema for the sample data according to the logic schema and the configuration file by:
loading and parsing the first section of the configuration file;
retrieving, based on the parsing of the first section of the configuration file, an operation to be performed from the first section of the configuration file;
loading and parsing the second section of the configuration file according to a value of an input attribute in the operation;
retrieving, based on the parsing the second section of the configuration file, an input definition of the operation, wherein the input definition of the operation includes a location of an attribute to be added to the DFDL schema, a name of the attribute, and a value of the attribute;
loading and parsing the logic schema using the location to determine a definition for an element; and
generating the element in the DFDL schema using the definition, wherein the element includes the name of the attribute and the value of the attribute;

receive a stream of data; and
convert, automatically, the stream of data into a DFDL
    document using the generated DFDL schema.

* * * * *